United States Patent [19]
Runge et al.

[11] 3,736,435
[45] May 29, 1973

[54] ARRANGEMENT FOR PREVENTING THE LOCKING OF WHEELS OF MOTOR VEHICLES

[75] Inventors: Detlev Runge, Gerlingen; Werner Götz, Monsheim, both of Germany

[73] Assignee: Robert Bosch GmbH, Stuttgart, Germany

[22] Filed: Dec. 21, 1971

[21] Appl. No.: 210,400

[30] Foreign Application Priority Data
Dec. 28, 1970  Germany.....................P 20 64 067.9

[52] U.S. Cl..............................307/10 R, 303/21 CG
[51] Int. Cl. .............................................B60t 8/10
[58] Field of Search ..................307/10 R; 303/21 R, 303/21 P, 21 BE, 21 CG; 188/181 A; 317/5; 340/262; 324/162

[56] References Cited
UNITED STATES PATENTS

| | | | |
|---|---|---|---|
| 3,656,816 | 4/1972 | Schlitz | 303/21 P |
| 3,522,973 | 8/1970 | Klein et al. | 303/21 R |
| 3,622,973 | 11/1971 | Leonberg et al. | 303/21 CG |
| 3,615,120 | 10/1971 | Yamazaki et al. | 340/262 |

Primary Examiner—Herman J. Hohauser
Assistant Examiner—M. Ginsburg
Attorney—Michael S. Striker

[57] ABSTRACT

A D.C. voltage of amplitude inversely proportional to vehicle speed is directly applied to the second inputs of a first and second comparator stage. The D.C. voltage is also applied to a logarithmic circuit and then differentiated. The output of the differentiator is applied to the first input of the second comparator stage and further, through an inverter, to the first input of the first comparator stage. The outputs of the comparator stages control, through a switching amplifier, the operation of an electrically operated pressure decreasing brake valve.

27 Claims, 12 Drawing Figures

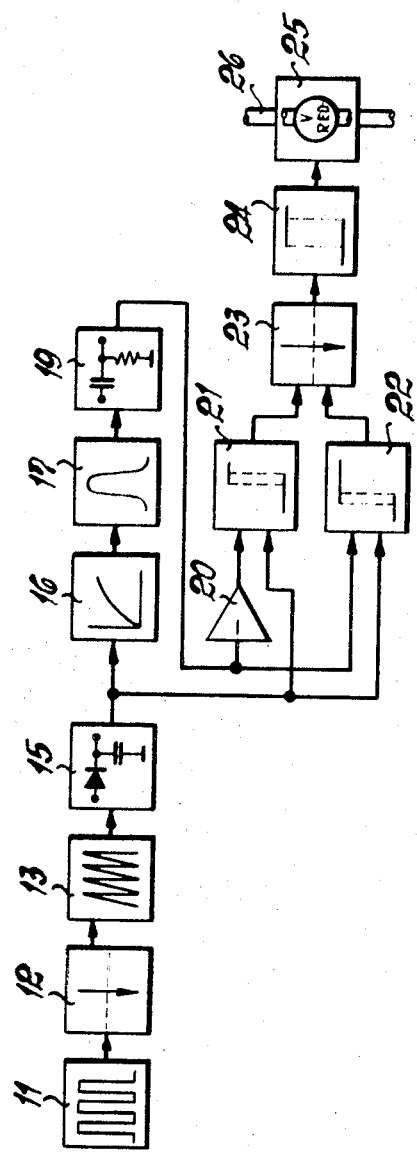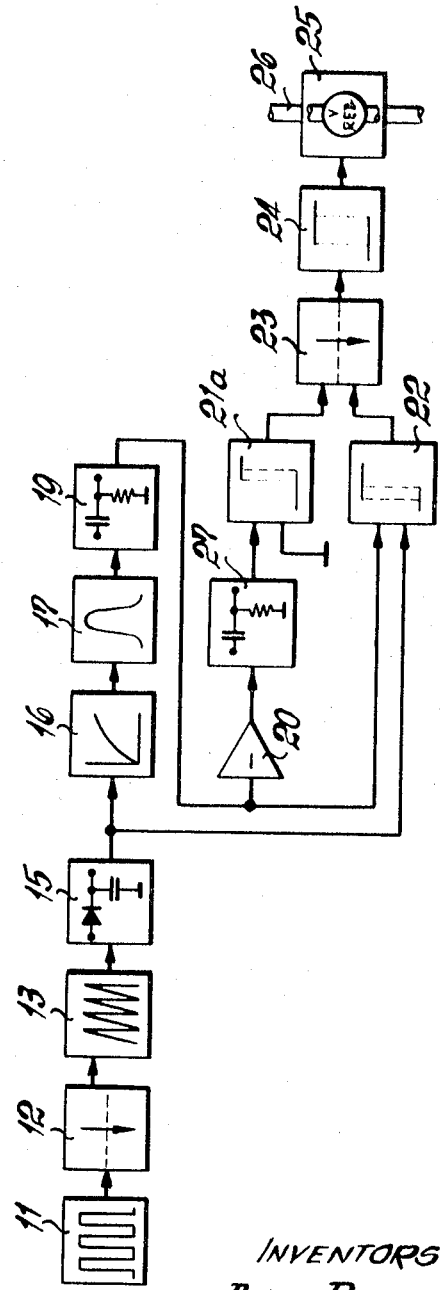

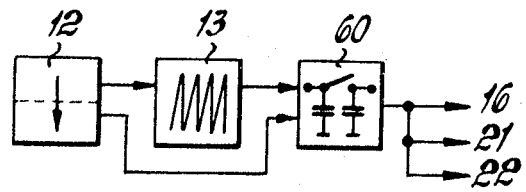
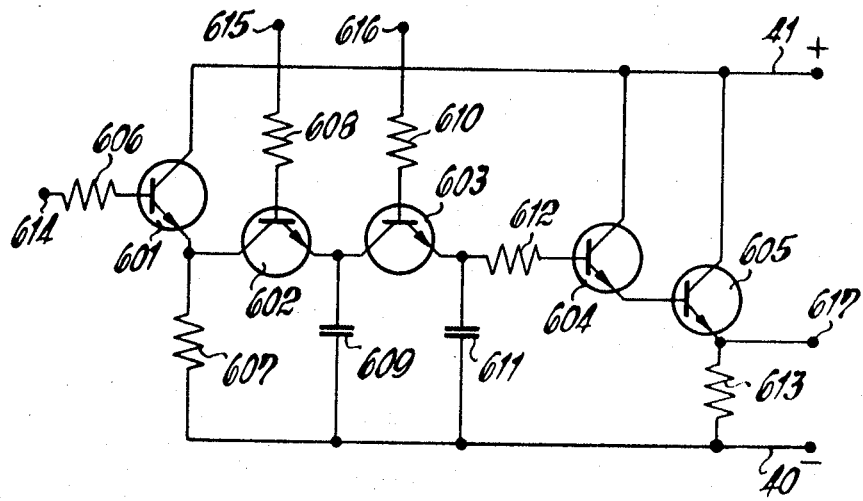
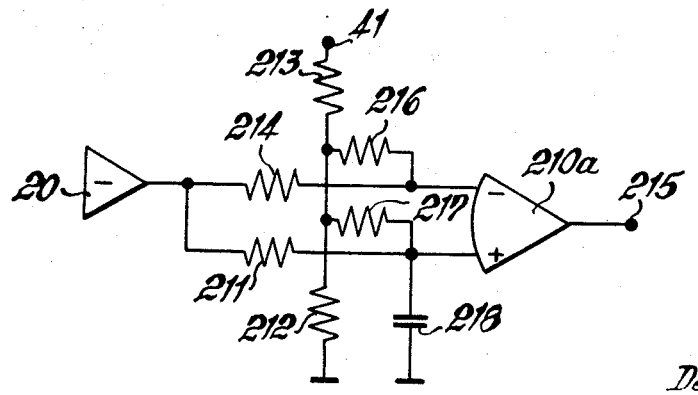

INVENTORS
Detlev RUNGE
Werner GÖTZ
BY
their ATTORNEY

INVENTORS
Detlev RUNGE
Werner GÖTZ
BY their ATTORNEY

INVENTORS
Detlev RUNGE
Werner GÖTZ
BY
their ATTORNEY

ARRANGEMENT FOR PREVENTING THE LOCKING OF WHEELS OF MOTOR VEHICLES

BACKGROUND OF THE INVENTION

This invention relates to a control arrangement for preventing the locking of a at least one wheel of a motor vehicle. In particular, it relates to such control arrangements wherein a D.C. voltage dependent upon the speed of rotation of the wheel is generated and, thereby furnishing an acceleration signal. Further, in these known systems a comparator circuit is furnished which operates a valve decreasing the brake pressure in dependence upon the amplitude of the above-mentioned acceleration signal.

In a known arrangement of the above-described type, the D.C. voltage is derived from a pulse generator which furnishes a pulse sequence having a repetition rate porportional to the rotational speed of the wheel and having a converter circuit which furnishes this D.C. voltage as a function of the above-mentioned pulse sequence. The converter circuit may for example be a low pass filter. The low pass filter forms a D.C. voltage whose amplitude is proportional to the rotational speed of the wheel.

The low pass filter must be so designed that even at low rotational speeds of the wheel its ripple voltage is not excessive. This is because excessive ripple causes the differentiating circuit to respond to individual waves of the ripple voltage. Thus as a rule the low pass filters must have a very steep cutoff with a top frequency lying somewhere between 10 and 30 Hz.

The use of such a low pass filter results in a definite disadvantage in that changes in the input frequency result in a change of output voltage after a definite delay time only. Depending upon the cutoff frequency of the filter the delay time may be anywhere between 30 to 60 milliseconds. However, the control frequency of the overall circuitry is approximately 10 Hz, so that the pressure decreasing valve is opened and closed once within each 100 milliseconds. If the above-mentioned delay time is assumed to be 30 milliseconds, the brake pressure control circuit thus always operates at a delay of a third of the period following the actual changes in acceleration of the wheel. A control of the braking power on the basis of optimum slippage is therefore difficult to achieve.

SUMMARY OF THE INVENTION

It is an object of the present invention to furnish a control circuit for valves operating to prevent the locking of a wheel of a motor vehicle, said control circuit having a substantially smaller delay time than the delay time of conventional circuits of this type.

In accordance with this invention, a D.C. output voltage is furnished which is inversely proportional to the speed of the motor vehicle. This D.C. voltage is applied to the input of second circuit means which furnish a second signal having an amplitude varying as a logarithmic function of the D.C. voltage. Differentiation means are connected to said second circuit means for differentiating said second signal, thereby furnishing an acceleration signal. Comparator means compare said acceleration signal and said D.C. voltage and furnish a comparator output signal which, in turn, operates brake control means. In a preferred embodiment of the present invention the brake control means comprise electrically operative valve means which decrease the pressure in the brake line.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a block diagram of a first embodiment of the present invention;

FIG. 2 is a block diagram of a second embodiment of the present invention;

FIG. 2a is a variation of the embodiment shown in FIGS. 1 and 2;

FIG. 3a is a circuit diagram corresponding to the block diagram of FIG. 2a;

FIG. 3b is a part of the circuit diagram corresponding to the block diagram of FIG. 2;

DESCRIPTION OF THE PREFERRED EMBODIMENT

Figure 3:
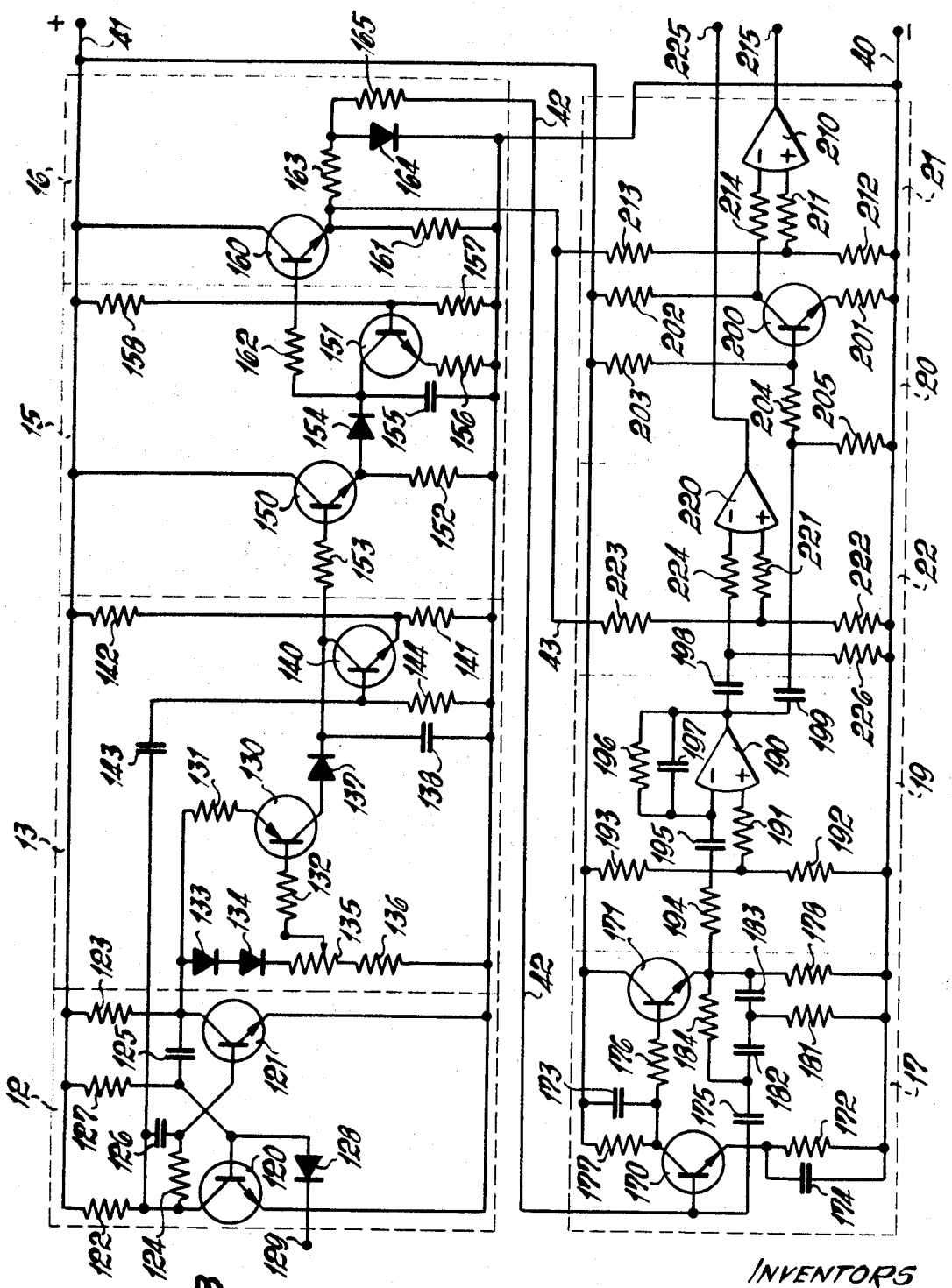
FIG. 3 is a circuit diagram of the essential blocks of the system shown in FIG. 1.

A preferred embodiment of the present invention will now be described with reference to the drawing.

Referring first to FIG. 1, reference numeral 11 denotes a pulse generator which is connected with the wheel of the vehicle and furnishes an A.C. voltage with frequencies proportional to the speed of said wheel. The output of this pulse generator is connected to a monostable circuit, 12, whose output is in turn connected to a sawtooth generator 13 followed by a peak rectifier 15. The above-mentioned circuits constitute first circuit means. Second circuit means comprise a logarithmic stage 16 whose input is connected to the output of the peak rectifier and whose output is connected to a band pass filter 17. The output of band pass filter 17 is connected to differentiation circuit means, 19. Further shown in FIG. 1 are comparator means comprising a first comparator stage 21 and a second comparator stage 22. The output of peak rectifier 15 is directly connected to the second inputs of the first and second comparator stage. The output of the differentiation means is directly connected to the first input of the second comparator stage and, via an inverter 20, to the first input of the first comparator stage 21. The outputs of comparator stages 21 and 22 are connected to the inputs of first storage means 23. The output of first storage means 23 operates a pressure reducing valve 25 through a switching amplifier 24. The pressure reducing valve 25 is connected into the brake line 26.

The second embodiment of the invention, shown in block diagram form in FIG. 2 differs from the above-described block diagram only in that comparator stage 21 is replaced by a comparator stage 21a whose second input is grounded and whose first input is connected to the output of the differentiation circuit means 19 not only through inverter 20 but also through additional differentiation means 27.

In FIG. 2a an alternate embodiment for the first circuit means of FIGS. 1 and 2 is shown. Here peak rectifier 15 is replaced by a sample and hold circuit 60. Sample and hold circuit 60 has a first and second input, the first input being connected to the output of sawtooth generator 13, while the second input is connected to a second output of monostable circuit 12.

FIG. 3 shows a circuit diagram of blocks 12 to 22 of FIG. 1. Monostable circuit 12 comprises transistors 120 and 121 both of whose emitters are connected to the negative supply line 40. The collectors of the two transistors are connected to the positive supply line 41 via resistors 122 and 123 respectively. The collector of transistor 120 is connected through a resistance 124 to the base of transistor 121, and a capacitor 126 is connected in parallel with resistance 124. The collector of transistor 121 is connected to the base of transistor 120 through a capacitance 125. The base of resistance 120 is further connected to the positive supply line 41 through a resistance 127 and to a terminal 129 through a diode 128. Capacitor 126 serves to furnish steep pulse edges. Terminal 129 is connected to the output of pulse generator 11.

Sawtooth generator 13 comprises a storage capacitor 138, herein referred to as the first storage capacitor. This capacitor is slowly charged in the interval between two output pulses of the monostable circuit 12 through a constant current source comprising a transistor 130. The collector of transistor 130 is connected to capacitor 138 through a diode 137, while its emitter is connected to the collector of transistor 121 through a resistance 131. Transistor 130 is a pnp transistor whose base is connected to the tap of a variable resistance 135 which forms part of a voltage divider connected between the collector of transistor 121 and line 40. The voltage divider comprises a diode 133 having an anode connected to the collector of transistor 121 and a cathode connected to the anode of diode 134 whose cathode is in turn connected to one terminal of the above-mentioned variable resistance 135. The other terminal of variable resistance 135 is connected through a further resistance 136 to the minus line 40. Diodes 133 and 134 serve as temperature compensation of the temperature varying emitter-base diode of pnp transistor 130.

Storage capacitor 138 is discharged through a first switching transistor 140. Specifically, one terminal of capacitor 138 is connected to the collector of npn transistor 140, whose emitter is connected to the positive supply line 41 through a resistance 142 and to the negative supply line through a resistance 141. The base of transistor 140 is connected through a capacitance 143 to the collector of transistor 120 and through a resistance 144 to negative supply line 40.

The voltage across capacitor 138 is applied through a resistance 153 to the base of a transistor 150 which forms part of peak rectifier 15. Transistor 150 serves as an impedance changing stage and is connected as an emitter follower. A resistance 152 connects the emitter of transistor 150 to the negative line 40, while its collector is directly connected to line 41. The voltage across emitter resistance 152 is applied to a second storage capacitor 155 through a diode (first diode means) 154. The discharge of capacitor 155 takes place through a constant current source comprising a transistor 151 having an emitter resistance 156, whose base voltage is derived from a voltage divider comprising resistors 158 and 157. The circuit is so designed that the discharge current from capacitor 155 is considerably less than the charging current thereto. For example the discharge current may be adjusted to a value corresponding to a vehicle deceleration of 100 n/sec². Transistor 151 and its associated circuitry are herein referred to as second constant current source means.

The voltage across capacitor 155 is applied to the base of a transistor 160 through a resistance 162. Transistor 160 forms part of the second circuit means. It is a logarithmic stage whose input, namely transistor 160 is again an emitter-follower stage having an emitter resistance 161. Connected in parallel with resistance 161 is the series combination of a resistance 163 and a diode 164. The cathode of diode 164 is connected to the negative line 140.

The voltage appearing across diode 164 is applied to band pass amplifier means 17 through resistance 165. The band pass amplifier 17 comprises two stage amplification having transistors 170 and 171. First transistor 170 has an emitter resistance 172 and a collector resistance 177, while the second transistor 171 has an emitter resistance 178 and a collector directly connected to the positive line 41. The collector of transistor 170 is connected to the base of transistor 171 through a resistance 176. Feedback and shunting elements are provided to eliminate both high and low frequencies.

A capacitor 174 connected in parallel with emitter-resistance 172 allows negative feedback at low frequencies. For the suppression of high frequencies a double T element is furnished which is connected between the emitter of transistor 171 and the base of transistor 170. This double T element consists of two resistances, 181, 184 and three capacitors, 183, 182, 175. High frequencies are also shunted by capacitor 173 connected in parallel with collector resistance 177.

Connected in cascade with band pass amplifier 17 are differentiation means 19. The active element therein is an operational amplifier 190. The voltage at the emitter of transistor 171 is fed to the inverting input of operational amplifier 190 through a resistance 194 and a differentiating capacitor 195. The voltage at the direct input of operational amplifier 190 is derived from a voltage divider having resistors 192 and 193 through a resistance 191 connected between the voltage divider tap and the direct input of operational amplifier 190. The output of operational amplifier 190 is coupled to the inverting input through a resistance 196 in parallel with a capacitor 197. Resistance 194 and capacitor 197 serve to suppress high frequency voltage spikes.

The second comparator stage 22 comprise an operational amplifier 220 which has no feedback and whose inverting input receives the output voltage of differentiation means 19 via a capacitor 198 and an input resistance 224. The output voltage of peak rectifier 15 is applied to the direct input of operational amplifier 220 through a voltage divider having resistors 222 and 223, via an input resistance 221. It will be noted that the output voltage of the peak rectifier is derived from the emitter of transistor 160 and is applied to the voltage divider having resistors 222 and 223 through a line 43. A resistance 226 connects the common point of capacitor 198 and resistance 224 to minus line 40.

The first comparator stage 21 is similarly connected as second comparator stage 22 and has an operational amplifier 210. An inverter stage 20 is connected between the output of differentiating means 19 and the inverting input of operational amplifier 210. Inverter stage 20 has a transistor 200 having a collector resistance 202 and an emitter resistance 201. The base of transistor 200 is connected with the common point of two resistances 203 and 204 which, together with a third resistance 205 form a voltage divider. The output of differentiating means 19 is connected via a capacitor 199 to the common point of resistances 204 and 205. The output of operational amplifier 210 is connected with an output terminal 215, while the output of operational amplifier 220 is connected to an output terminal 225. Both of these output terminals are connected to the inputs of a storage stage 23, as reference to FIG. 5 will show. Storage stage 23 constitutes first storage means.

FIG. 3a shows the circuit of sample and hold circuit 60. A transistor 601 connected as an emitter follower and having an input resistance 606 and an emitter-resistance 607 constitutes the input to the stage. The output of the stage is an impedance changing stage, namely a Darlington circuit comprising transistor 604 and 605. Power output transistor 605 has an emitter resistance 613, while preamplifier transistor 604 has a base resistance 612. The emitter of transistor 605 is connected to an input terminal 617 which is connected to the input of the second circuit means, that is logarithmic stage 16 or, more specifically, resistance 162 of said stage. Similarly, input terminal 614 connected to resistance 606 in FIG. 3a is connected to the output of sawtooth generator 13, that is the collector of transistor 140.

Connected to the emitter of input transistor 601 is the collector of a transistor 602 whose emitter is connected to the collector of a second transistor 603. The emitters of both transistors 602 and 603 are connected to minus line 40 through a capacitor, 609 and 611 respectively. Base resistance 612 is connected to the emitter of transistor 603. The base of transistor 602 is connected to an input terminal 615 via a resistance 608, while the base of transistor 603 is connected to an input terminal 616 via a resistance 610. Input terminal 615 and 616 may be connected to the two outputs of monostable multivibrator 12, that is with the collectors of transistors 120 and 121 respectively.

FIG. 3b shows a circuit which may be substituted for the additional differentiating means 27 of FIG. 2. The direct and inverting input of operational amplifier 210a are connected to the output of inverter 20 through a resistance 211 and 214 respectively. They are further connected via a resistance 217 and 216 to the common point of resistors 212 and 213 which form a voltage divider. The non-inverting input is further connected to ground via capacitor 218.

Figure 5:
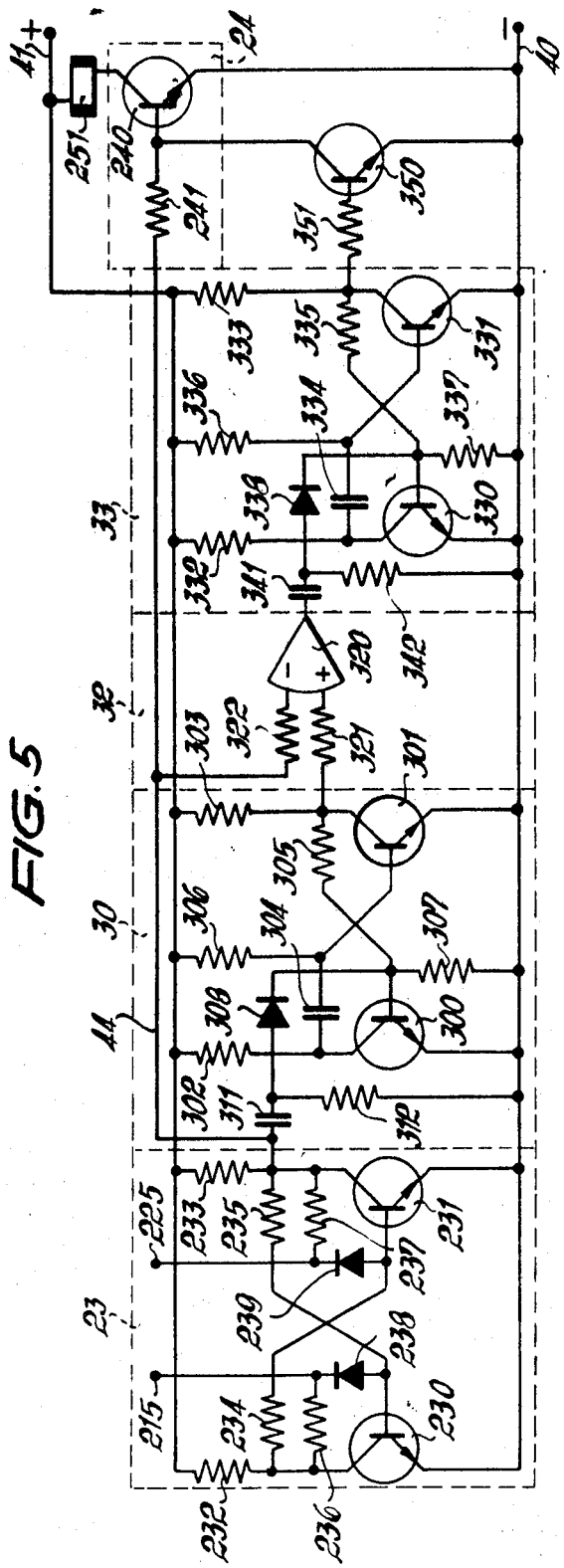
FIG. 5 is a circuit diagram of the safety arrangement shown in FIG. 4.

FIG. 5 shows a safety arrangement which closes pressure decreasing valve 25 for an adjustable time interval in case the control circuit begins to oscillate. The output of storage means 23 is connected to its input through monostable feedback circuit means 28. Further, the output of storage stage 23 is connected to the input of a switching amplifier 24, to the first input of a third comparator stage 32 and to the input of a third monostable stage 30. The output of monostable stage 30 is connected to the second input of the third comparator stage 32. The output of third comparator stage 32 controls the base of a switching transistor 350 via a fourth monostable circuit 33. The emitter of transistor 350 is connected to ground, while its collector is connected with the input of switching amplifier 24.

Reference to FIG. 5 shows that storage stage 23, the first storage means, comprise a bistable stage having transistors 230 and 231. Transistors 230, 231 have collector resistances 232, 233 respectively. The collector of each transistor is connected to the base of the other transistor through a resistance 234, 235. A resistance 236 connects an input terminal 215 to the collector of transistor 230 while a diode 238 connects this terminal to the base of said transistor. Similarly, input terminal 225 is connected to the base of transistor 231 through diode 239 and to its collector through resistance 237.

The third monostable multivibrator 30 comprises a differentiating input comprising a capacitor 311, a resistance 312 and a diode 308. Transistors 300 and 301 respectively have collector resistances 302 and 303. The collector of transistor 300 is capacitively coupled through a capacitor 304 to the base of the second transistor 301, while the collector of transistor 301 is connected to the base of transistor 300 via a resistance 305. The base of transistor 301 is further connected to positive line 41 via a resistance 306.

Third comparator stage 32 comprises an operational amplifier 320 which has no feedback, but has two input resistances 321 and 322.

Fourth monostable stage 33 is similarly constructed to third monostable stage 30 and differs from said third stage only in the components used. Reference numbers of the individual elements are increased by 30 relative to the third monostable stage 30.

Switching amplifier 24 comprises a power transistor 240 which has a base resistance 241. The base is also connected with the collector of switching transistor 350. The base of switching transistor 350 is connected to the output of the fourth monostable stage 33 via a resistance 351. The activating winding 251 of the pressure decreasing valve 25 is connected between the collector of transistor 240 and positive line 41.

Figure 6:
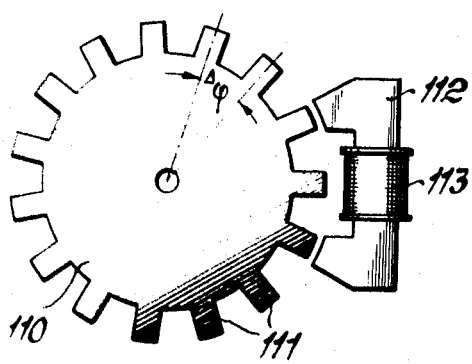
FIG. 6 is a sketch of a pulse generator.

FIG. 6 is a sketch of pulse generating means 11. It comprises a toothed wheel 110 which is made from soft magnetic material and directly mounted on the shaft of the wheel of the vehicle. The wheel has teeth 111 which are spaced one from the other by an angular distance of $\Delta\phi$. Mounted in operative proximity of the teeth is a horse-shoe shaped yoke 112 which also is made of soft magnetic material and has a magnetization coil 113. At the terminal of this coil A.C. voltage pulses of sinusoidal form are furnished when yoke 112 is premagnetized by a D.C. current through coil 113.

Figure 7:
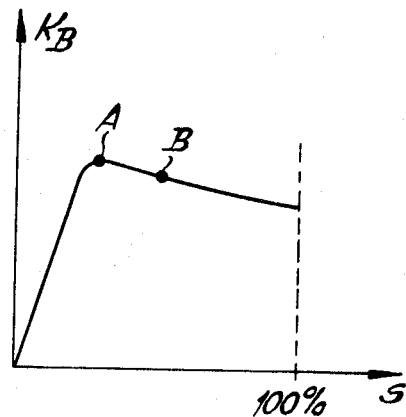
FIG. 7 is a diagram showing the braking power as a function of slippage.
Figure 8:
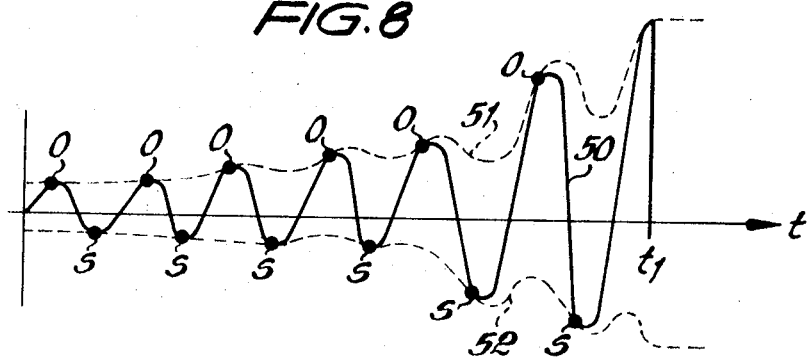
FIG. 8 is a diagram useful in explaining the operation of the system of FIG. 1.
Figure 9:
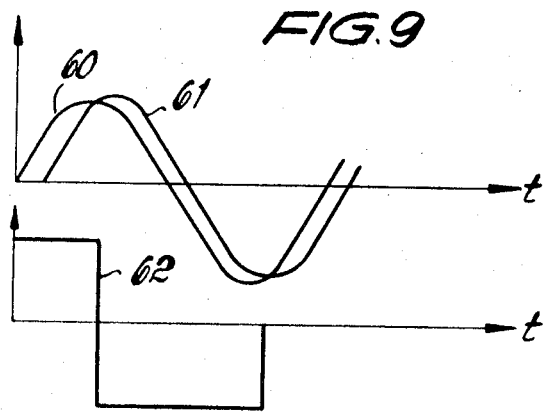
FIG. 9 is a diagram for explaining the operation of the system of FIG. 2.

FIGS. 7, 8 and 9 are going to be described in conjunction with the functional description of the circuit which now follows.

It has already been stated that it is a characteristic of the present invention that the first circuit means furnish an output voltage which is inversely proportional to the speed of the vehicle, that is inversely proportional to the repetition rate of the pulses furnished by pulse generator 11. Further, it is essential for the present invention that a logarithmic stage is included in the second circuit means which are interconnected between the differentiation circuit means 19 and the output of the first circuit means.

Derivatives with respect to time are hereinafter designated by a dot:

$$\dot{\phi} \equiv (d\phi/dt) \quad \ddot{\phi} \equiv (d^3\phi/dt^3)$$

The rotational velocity of the wheel $\dot{\phi}$ is the first derivative of angle $\phi$ or, as a good approximation, as the differential $$\dot{\phi} \equiv d\phi/dt \approx \Delta\phi/\Delta t$$

If it is assumed that the angular difference $\Delta\phi$ is equal to the constant distance between teeth of the pulse generator (FIG. 6), namely $\Delta\phi$ then the time difference $\Delta t$ is identical to the changing interval between pulses $\tau$. Then the wheel velocity $\dot{\phi} = (\Delta\phi/\tau)$ (61). By differentiating equation (61) with respect to time the wheel acceleration is found to be:

$$\ddot{\phi} = -\Delta \phi \cdot (\dot{\tau}/\tau^2)$$

(62)

Equation (62) is not readily solved electronically. Therefore it will be multiplied by $\tau$:

$$\tau \ddot{\phi} = -\Delta \phi \cdot (\dot{\tau}/\tau) = -\Delta \phi \cdot (d/dt)(\ln\tau)$$

(63)

Here $\ln\tau$ is the natural logarithm of $\tau$. When the wheel begins to lock, the deceleration exceeds an upper limiting value $-\ddot{\phi}_o$, at which the pressure decreasing value 25 must be opened. Following this opening the wheel accelerates again and, when a positive acceleration $\ddot{\phi}$ s is exceeded, the valve must again be opened.

The two equations:

$$\tau \ddot{\phi}_o = \Delta \phi (d/dt)(\ln\tau)$$

(63a)

$$\tau \ddot{\phi}_s = -\Delta \phi(d/dt)(\ln\tau)$$

(63b)

are solved by the circuit of FIG. 3 in an electronic manner. specifically, equation (63a) is solved by the second comparator stage 22 while equation (63b) is solved by the first comparator stage 21. In monostable stage 12, under quiescent conditions first transistor 120 is conductive, while second transistor 121 is blocked. This means that under quiescent conditions the collector of the second transistor 121 is substantially at the potential of positive line 141. When a negative pulse is applied from the pulse generator 11 to input terminal 129, the collector potential of the second transistor 121 jumps to substantially the negative potential of line 40 for the duration of the pulse. Constant current source 130 in the sawtooth generator 13 thus charges storage capacitor 138 in the time between output pulses of monostable stage 12. Capacitor 138 is charged more, the longer the interval between output pulses of monostable stage 12. The length of this interval is approximately equal to the interval between pulses $\tau$ when the pulse width of the monostable stage 12 is sufficiently small. During the time that an output pulse is furnished by monostable stage 12, storage capacitor 138 is discharged through first switching transistor 140.

The output voltage of sawtooth generator 13 is connected to the input of peak rectifier 15. Capacitor 155 the second storage capacitor is charged to a voltage which is proportional to the peak voltage of the sawtooth pulses and therefore proportional to the interval between pulses, $\tau$. The voltage at the emitter of transistor 160 is therefore proportional to the time $\tau$ between pulses and therefore inversely proportional to the rotational wheel velocity $\dot{\phi}$.

The sample and hold circuit 60 according to FIG. 2a serves the same function as peak rectifier 15, but furnishes an output voltage which has less ripple. Transistors 601 and 602 (FIG. 3a) are conductive between two output pulses of monostable stage 12. Thus the first capacitor 609 is charged to a voltage which is proportional to the distance $\tau$ between pulses. However, within the pulse duration of pulses furnished by monostable stage 12, transistor 601 and 602 are blocked, while transistor 603 is conductive. During this time the second capacitor 611 whose capacity is substantially less than that of first capacitor 609, is charged to the voltage existing on capacitor 609. The voltage across capacitor 611 thus corresponds with very little delay and a very small ripple to the peak voltage furnished by sawtooth generator 13.

Equation (63a) and (63b) are thus solvable electronically. The constant threshold values $-\ddot{\phi}_o$ and $\ddot{\phi}_s$ are adjusted by means of voltage dividers 23, 22 and 213, 212 respectively and multiplied with D.C. voltage $\tau$ via line 43. The voltages which correspond to the second side of the two equations (63a) and (63b) are applied to the two second inputs of comparator stages 21 and 22 respectively. The negative sign in equation (63b) is taken into consideration by the inverter stage 20. The two right-hand sides of equation (63a) and (63b) are identical and the corresponding D.C. voltage is derived from differentiation circuit 19.

The logarithmic element in the logarithmic stage 16 is a semi-conductor diode 164. Both germanium and silicon diodes have a logarithmic characteristic as at least part of their overall characteristic. For small voltages in the conductive direction, the diodes first do not conduct at all. Above a threshold voltage (0.7 volts for silicon diodes) the current increases exponentially as a function of increasing voltage. This means that the voltage across the diode will vary logarithmically with current through the diode.

FIG. 8 shows the variation with respect to time of a regulating process using the present invention. Solid curve 50 shows the variation of voltage derivative with respect to time $(d/dt)(\ln\tau)$. Line 51 shows the variation of input voltage $\tau\ddot{\phi}_o$ of second comparator stage 22, while dashed line 52 shows the variation of input voltage $\tau\ddot{\phi}_s$ of first comparator stage 21.

When the arrangement for preventing the locking of the wheel of a vehicle according to the present invention begins to operate, a braking process takes place exactly as when known arrangements of this type are used. After the brake pedal is first activated, the deceleration increases according to curve 50 until the first point designated with O is reached. At this point $\Delta\phi$ $(d/dt)(\ln\tau)$ is equal to the adjusted threshold value $\tau\ddot{\phi}_o$. The second comparator stage 22 thus operates and opens the pressure reducing valve 25 so that the deceleration decreases and a positive acceleration is applied to the wheel. This continues until the first point designated with a S is reached. Here the first comparator stage 21 furnishes an output, closing the pressure decreasing valve. This process repeats periodically until the vehicle stops at time $t_1$.

The preferred embodiment of the present invention described up to this point constitutes an arrangement for preventing the locking the wheels of a vehicle which operates considerably faster than known arrangements of this type. There is no low pass filter and the peak rectifier 15 has a delay time of less than 0.1 milliseconds. Band pass amplifier 17 is preferably so designed that its amplification drops 3 $dB$ at a lower limiting frequency of 7 Hz and at an upper frequency of 35 Hz. This amplifier then has a delay time of 3 milliseconds and successfully suppresses small variations in amplitude and frequency of the output pulses of pulse generator 11, such as may arise when holes in the road are encountered.

Since differentiating means 19 have only a very small delay time of approximately 0.5 milliseconds, the total delay of the circuit according to FIG. 1 is smaller by a factor of 10 than the delay factor of known circuit arrangements of this type.

When a sample and hold circuit 60 is used the delay time may be decreased even further, since band pass amplifier 17 is no longer essential. The delay time of 3 milliseconds is thus eliminated and the delay of sample and hold circuit 60 in itself is smaller than that of peak rectifier 15. The second embodiment of FIG. 2 further results in the elimination of an additional difficulty. The plot in FIG. 7 of brake power versus slippage shows that an operating point A should preferably be reached at which the braking power is maximum. Since in the known control circuits and for the first embodiment of the present invention only the wheel acceleration is measured, it is possible that under certain road conditions only an operating point B is achieved which does not coincide with the maximum brake power. This is the case because on very slippery streets the wheel tends to lock rapidly and come practically to a standstill, that is, a condition of approximately 80 percent slippage is reached. Then the pressure decreasing valve is open and the wheel is again positively accelerated. The adjusted threshold value for closing of the pressure decreasing valve may then already be reached at, for example, 50 percent slippage (B). However, at operating point B the lateral guidance of the wheel is considerably worse than at operating point A, so that the vehicle will tend to skid. When operating point A is to be exactly achieved, one must wait until the brake power and thus the positive wheel acceleration $\dot{\phi}$ reaches its maximum value A. The maximum of $\dot{\phi}$ is reached when the third derivative with respect to time of the angle of rotation, or the second derivative with respect to time of the angular speed, $\ddot{\phi}$, is equal to zero.

The following mathematical considerations explain with what circuits the value of $\ddot{\phi}$ may be determined.

Further differentiation of the equation labeled 62 results in the following equation:

$$\ddot{\phi} = \Delta \phi (2\ \tau\dot{\tau}^2 - \tau^2\ \ddot{\tau}/\tau^4) = \Delta \phi [2/\tau(\dot{\tau}/\tau)^2 - \ddot{\tau}/\tau^2]$$

(64)

The element $\ddot{\tau}/\tau^2$ is derived by differentiation of $\dot{\tau}/\tau$ with respect to time:

$$d/dt\ (\dot{\tau}/\tau) = \tau\ddot{\tau} - \dot{\tau}^2/\tau^2 = (\tau\ddot{\tau}/\tau^2) - (\dot{\tau}^2/\tau^2)$$
$$\rightarrow \ddot{\tau}/\tau^2 = (\dot{\tau}/\tau) + (d/dt)\ (\dot{\tau}/\tau)$$

(65)

When equation (65) is substituted in the equation (64), the following expression for $\ddot{\phi}$ results:

$$\ddot{\phi} = (\Delta\phi/\tau)\ (\dot{\tau}/\tau)^2 - (d/dt)\ (\dot{\tau}/\tau)$$

(66)

The second member derivative with respect to time $(d/dt)\ (\dot{\tau}/\tau)$ may be derived electronically from the output of the first differentiating circuit 19 by means of a second differentiating circuit 27.

The first member, $(\dot{\tau}/\tau)^2$ in equation (66) is, however, not readily derived. However, in practical experiments, it has been found that the delay time of the complete control arrangement may be compensated for with sufficient accuracy if the element containing $(\dot{\tau}/\tau)^2$ as well as the factor of $1/\tau$ before the square brackets in equation (66) is neglected, that is when the equation simply reads $\ddot{\phi} \approx -\Delta\phi(d/dt)\ (\dot{\tau}/\tau)$. The first comparator stage 21a already operates before $\ddot{\phi} = 0$. The percentage error which is made when $(\dot{\tau}/\tau)^2 = 0$ is assumed, is larger, the larger the distance between pulses $\tau$.

It is shown here that it is very advantageous that in the circuit in accordance with this invention all voltage values are related to the distance between pulses and not directly to the angular velocity. The start of operation of the first threshold circuit 21a is advanced relative to the time in which $\ddot{\phi}$ is equal to zero by a percentage of the distance between pulses $\tau$ which increases the larger this distance between pulses. The time constant of the system is larger the larger the distance between pulses $\tau$, that is the smaller the angular velocity. The above-mentioned approximation compensates for the time constants of the circuits, since for large $\tau$ the initiation of the operation of the threshold switch is advanced further. One can thus achieve an advance in the initiation of the operation of first comparator stage 21a which is almost independent of the angular wheel velocity, thereby compensating almost completely for the already small delay time introduced by the control circuit.

Thus the regulating process does not follow along the same lines in the second embodiment as in the first embodiment. The pressure decreasing valve is opened when the wheel deceleration exceeds an upper limiting value, and is closed shortly beofre the seocnd derivative of velocity with respect to time, $\ddot{\phi}$ is equal to zero. It is thus possible to achieve the operating point A of FIG. 7, independent of the conditions of the road. Just this type of operation, independent of road conditions, could be achieved by known control circuits for preventing the locking of the wheels of a vehicle only with extremely great amounts of electronic equipment.

Thus the control arrangement described above fulfills first the requirement for a substantial decrease in the delay time without an increase in electronic components. Further, it also, in the second embodiment allows operation independent of the road conditions. This operation requires only a single additional differentiation circuit, namely circuit 27.

The circuit of the second embodiment of the present invention may be further simplified as shown in FIG. 3b, where the second differentiating circuit 27 is omitted. The output voltage of the inverter 20 is applied to both inputs of operational amplifier 210a. Capacitor 218 effects a phase shift between the two input voltages 60 and 61 (see FIG. 9). When the function $\dot{r}/r$ reaches a maximum, a change in the sign of the difference between the two input voltages 60 and 61 occurs, so that the output voltage of operational amplifier 210 changes sign. Curve 62 shows the corresponding variation of output voltage of operational amplifier 210a with respect to time.

The circuit of FIG. 3b has the further advantage that a change in sign of the difference of the two input voltages, 60, 61, occurs even when a wheel locks completely and suddenly, so that in any case the pressure decreasing valve is again closed.

Figure 4:
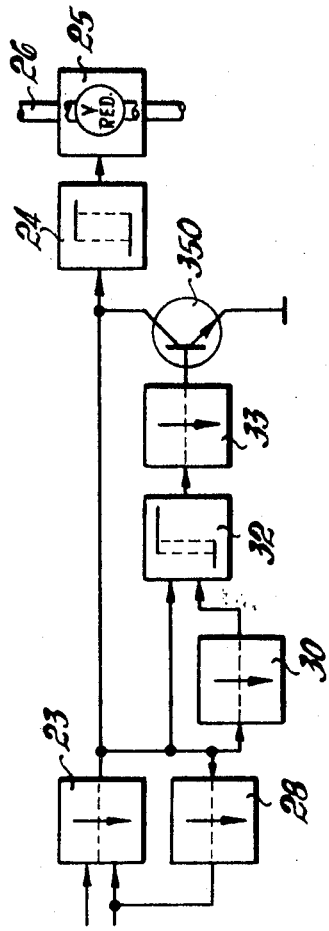
FIG. 4 is a block diagram of a safety arrangement usable in conjunction with the systems of FIGS. 1 and 2.

A further difficulty is present in all known arrangements for preventing the locking of wheels of vehicles. This is that these circuits are particularly sensitive to stray noise pulses. Such noise pulses can cause oscillations in the circuits, so that the pressure decreasing valve 25 may be opened and closed at a relatively high frequency of 40 to 50 Hz for no visible reason. In theory it is possible that such oscillations may be suppressed by a low pass filter which is arranged between the storage stage 23 and amplifier 24. However, such a low pass filter generates an additional delay time which is of course to be avoided. Thus it has been found advantageous to insert a digital low pass filter as shown in FIG. 4.

The normal regulating frequency of the control circuit is approximately 6 Hz. A maximum frequency of 20 Hz is still admissible. Thus one designs the third monostable stage 30 for a pulse width of approximately 50 milliseconds. If the storage 23 yields a positive output pulse and thus opens valve 25 via line 44, a pulse of the third monostable stage 30 starts simultaneously. The output voltage of third comparator stage 32 is generally negative, since the line 44 is connected to the inverting input of operational amplifier 320. It may however become positive if a positive voltage is supplied to the direct input of operational amplifier 320 by the third monostable stage 30 and when simultaneously the input voltage to the inverting input of operational amplifier 320 is negative. This is the case when the output pulse from stage 23 stops before the output pulse from stage 30 has stopped. Such behaviour is, however, a sign of an unwanted oscillation in the control circuitry.

As soon as the output of the third comparator stage 32 is positive, the fourth monostable stage 33 is switched to its unstable state wherein power transistor 240 is blocked via switching transistor 350. The pressure decreasing valve 25 remains closed until such time as the pulse from the fourth monostable stage has ended, that is a time of approximately 50 milliseconds. During a time of 50 milliseconds unwanted oscillations in the circuit have generally died down.

Finally, a safety arrangement for storage 23 must still be discussed. In accordance with FIGS. 1 and 2 this stage is a monostable multivibrator. The pulse width of this monostable multivibrator is approximately 200 milliseconds, so that the pressure decreasing valve 25 is, in any case, reclosed after 200 milliseconds, even if no acceleration signal is derived from the wheel. Thus the vehicle, upon failure of the pulse generator or the sawtooth generator, does not continue in an unbraked fashion after the pressure decreasing valve has once been opened. However, in accordance with FIG. 4, stage 23 is a bistable stage whose output is coupled back to its output through a second monostable stage 28. This results in the same desirable type of operation, while further permitting the reset time to be made adjustable in experimental circuits.

Thus in addition to the above-mentioned advantages, the circuits of the present invention offer safe operation in case of malfunctioning of parts of the control circuit and suppression of unwanted oscillations of the control circuit. All these advantages can be incorporated into known control circuits of this type only with substantially greater amounts of equipment.

While the invention has been illustrated and described as embodied in a specific electronic circuit, it is not intended to be limited to the details shown, since various modifications and circuits and structural changes may be made without departing in any way from the spirit of the present invention.

Withour further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a motor vehicle having an internal combustion engine, an arrangement furnishing an acceleration signal for use as a control for the brakes comprising, in combination, first circuit means coupled to said engine and responsive to the speed thereof, for furnishing a first signal having a first signal amplitude decreasing with increasing engine speed; second circuit means connected to said first circuit means for receiving said first signal and furnishing a second signal having a second signal amplitude varying as a logarithmic function of said first signal amplitude; and differentiation circuit means connected to said second circuit means differentiating said second signal, said so-differentiated second signal constituting said acceleration signal.

2. An arrangement as set forth in claim 1, further comprising brake control means operatively associated with the brakes of said motor vehicle; and first comparator means interconnected between said differentiation means and said brake control means for operating said brake control means in dependence on said acceleration signal.

3. An arrangement as set forth in claim 2, wherein said first circuit means comprise pulse generator means coupled to a wheel of said motor vehicle for furnishing a pulse sequence having a pulse repetition rate proportional to the speed of said engine; and converter means furnishing a D.C. voltage having an amplitude decreasing with increasing pulse repetition rates, said D.C. voltage constituting said first signal.

4. An arrangement as set forth in claim 2, wherein said brake control means comprise valve means decreasing the pressure in a brake upon receipt of a brake control signal; and wherein said first comparator means furnish said brake control signal in dependence upon the amplitude of said acceleration signal.

5. An arrangement as set forth in claim 4, wherein said first comparator means comprise additional differentiation means furnishing a second derivative signal corresponding to the second derivative with respect to time of the speed of said internal combustion engine.

6. An arrangement as set forth in claim 3, wherein said converter means comprise sawtooth generator means; and peak rectifier means connected in series with said sawtooth generator means.

7. An arrangement as set forth in claim 6, further comprising monostable circuit means connected between said pulse generator means and said sawtooth generator means, for furnishing a sequence of rectangular pulses having a constant pulse width independent of said pulse repetition rate.

8. An arrangement as set forth in claim 7, wherein said sawtooth generator means comprise first storage capacitor means, first constant current source means charging said first storage capacitor means in the intervals between said rectangular pulses, and discharge means discharging said first storage capacitor means for the duration of each of said rectangular pulses.

9. An arrangement as set forth in claim 8, wherein said discharge means comprise first switching transistor means.

10. An arrangement as set forth in claim 9, wherein said first constant current source means furnishes a current having an amplitude substantially less than the current flowing during the discharge of said first storage capacitor means.

11. An arrangement as set forth in claim 6, wherein said peak rectifier means comprise first diode means, storage capacitor means connected in series with said first diode means, and constant current source means connected to said storage capacitor means for effecting the discharge thereof.

12. An arrangement as set forth in claim 11, further comprising decoupling means interconnected between said first diode means and said sawtooth generator means.

13. An arrangement as set forth in claim 12, wherein said decoupling means comprise an emitter-follower connected transistor stage.

14. An arrangement as set forth in claim 1, further comprising bandpass amplifier means connected between said second circuit means and said differentiation circuit means, said bandpass amplifier means amplifying signals in a determined frequency range and suppressing frequencies outside of said determined frequency range.

15. An arrangement as set forth in claim 14, wherein said second circuit means comprise diode means furnishing a voltage varying as a logarithmic function of the current flowing therethrough.

16. An arrangement as set forth in claim 2, wherein said comparator means comprise a first and second comparator stage, having a first and second comparator output respectively; and first storage means connected to said first and second comparator output.

17. An arrangement as set forth in claim 16, wherein said first and second comparator stage each have a first and second comparator input; further comprising means connecting said second inputs directly to the output of said first circuit means; inverter means connecting said first input of said first ocmparator stage to the output of said differentiation circuit means; and means connecting said second input of said second comparator stage directly to the output of said differentiation circuit means.

18. An arrangement as set forth in claim 16, wherein said first and second comparator stages each comprise a first and second comparator input; further comprising inverter means connected to the output of said differentiation circuit means; additional differentiation means having an input connected to the output of said inverter means and an output connected to said first input of said first comparator stage; means connecting said second input of said first comparator stage directly to ground potential; means connecting said first input of said second comparator stage directly to said output of said differentiation circuit means; and means connecting said second input of said second comparator stage directly to the output of said first circuit means.

19. An arrangement as set forth in claim 16, wherein said first storage means comprise a first and second storage input respectively connected to said first and second comparator outputs; wherein said brake control means comprise electrically operated valve means; further comprising switching amplifier means connected between said first storage means and said electrically operative valve means.

20. An arrangement as set forth in claim 19, wherein said first storage means comprises monostable circuit means.

21. An arrangement as set forth in claim 19, wherein said first storage means comprise bistable circuit means having a bistable circuit output; further comprising monostable feedback circuit means connected from said bistable circuit output to said second storage input.

22. An arrangement as set forth in claim 19, further comprising low pass filter means interconnected between said first storage means and said switching amplifier means.

23. An arrangement as set forth in claim 22, wherein said low pass filter means comprise digital low pass filter means.

24. An arrangement as set forth in claim 22, wherein said low pass filter means comprise switching transistor means connected to the input of said switching amplifier means for short circuiting said input when the repetition rate of pulses at the output of said first storage means exceeds a predetermined repetition rate.

25. An arrangement as set forth in claim 24, wherein said low pass filter means comprise comparator means having a first and second comparator input and an output; monostable circuit means connecting said second comparator input to said output of said first storage means; means directly connecting said first comparator input of said comparator means to said output of said first storage means; wherein said switching transistor means has a base; and means connecting said output of said comparator means to said base of said switching transistor means.

26. An arrangement as set forth in claim 25, wherein said means connecting said output of said comparator means to the base of said switching transistor means comprise monostable circuit means.

27. An arrangement as set forth in claim 2, wherein said first circuit means comprise sample-and-hold circuit means.

* * * * *